United States Patent [19]

Wallström et al.

[11] Patent Number: 5,534,049

[45] Date of Patent: Jul. 9, 1996

[54] FLEXOGRAPHIC PRINTING INK

[75] Inventors: Eva Wallström, Copenhagen; Peter B. Lund, Frederiksberg; Arne Helgesen, Roskilde, all of Denmark

[73] Assignee: Girobank A?S, Denmark

[21] Appl. No.: 437,518

[22] Filed: May 9, 1995

Related U.S. Application Data

[63] Continuation of Ser. No. 199,224, filed as PCT/DK92/00261, Sep. 2, 1992 published as WO93/05120, Mar. 18, 1993, abandoned.

[30] Foreign Application Priority Data

Sep. 3, 1991 [DK] Denmark ................................ 1542/91

[51] Int. Cl.$^6$ .................................................. C09D 11/02
[52] U.S. Cl. .................... 106/22 R; 106/22 A; 106/31 R
[58] Field of Search ................................ 106/22 R, 22 A, 106/31 R

[56] References Cited

U.S. PATENT DOCUMENTS

| | | | |
|---|---|---|---|
| 3,709,903 | 1/1973 | Jefferies et al. | 540/123 |
| 3,839,291 | 10/1974 | Avis | 528/250 |
| 3,860,547 | 1/1975 | Faessinger et al. | 524/598 |
| 3,864,296 | 2/1975 | Faessinger | 524/598 |
| 3,880,792 | 4/1975 | Faessinger | 524/608 |
| 4,066,585 | 1/1978 | Schepp et al. | 106/27 A |
| 4,340,386 | 7/1982 | Pociluyko | 8/541 |
| 4,402,748 | 7/1983 | Killat et al. | 106/20 R |
| 4,432,900 | 2/1984 | Pociluyko | 8/541 |
| 4,963,188 | 10/1990 | Parker | 106/20 R |
| 5,039,339 | 8/1991 | Phan et al. | 106/20 R |
| 5,828,894 | 2/1994 | Albert et al. | 106/22 H |

FOREIGN PATENT DOCUMENTS

| | | |
|---|---|---|
| 0179319 | 4/1986 | European Pat. Off. . |
| 2030998 | 4/1980 | United Kingdom . |
| 2087418 | 5/1982 | United Kingdom . |

OTHER PUBLICATIONS

"The Printing Ink Manual", Fifth Edition, Leach et al., pp. 265–273, Jan. 1993.
Derwent's abstract No. 693 37 B/38, SU 637 415, publ. week 7938, 1978.
Derwent's abstract No. 115 31 B/06, SU 598 921, publ. week 7906, 1978.

*Primary Examiner*—Helene Klemanski
*Attorney, Agent, or Firm*—Merchant, Gould, Smith, Edell, Welter & Schmidt

[57] ABSTRACT

A flexographic printing ink comprising a solvent, a colorant, a binder and additives, wherein the solvent is essentially water; the colorant is a water-soluble dye or a mixture of such dyes dissolved in the solvent; the binder is selected from (meth)acrylic resins dispersed in the solvent at a pH above 7, preferably at pH about 8–9; and the additives include a wax selected from the group consisting of polyolefin waxes, paraffin waxes, and mixed polyolefin and paraffin waxes dispersed in the solvent. A flexographic printing ink concentrate for preparing this printing ink comprising the components mentioned above, wherein the amount of solvent is reduced by about 1–20%, preferably 5–20%, compared with the amount of solvent in a flexographic printing ink ready for use. A method for printing a substrate by the flexographic printing process which method comprises applying the flexographic ink to the substrate and subjecting the applied ink to conditions sufficient to fix the print, and substrate having a permanent print thereon which is derived from the flexographic printing ink.

20 Claims, No Drawings

FLEXOGRAPHIC PRINTING INK

This is a File Wrapper Continuation application of application Ser. No. 08/199,224, filed as PCT/DK92/00261, Sep. 2, 1992 published as WO93/05120, Mar. 18, 1993, now abandoned.

BACKGROUND OF THE INVENTION

The invention relates to a flexographic printing ink, comprising a solvent, a colourant, a binder and additives, a flexographic printing ink concentrate, an improved flexographic printing method, and a substrate having a permanent print thereon.

Aqueous printing fluids for printing unsized webs, in particular cellulosic webs, by rotogravure, in particular by intaglio printing, employing water-soluble dyes and having good water insensitivity after drying of the fluid have been prepared by combining self-curing, water-soluble, cationic thermosetting resins and selected water-soluble dyes. The thermosetting resin cures or sets by drying of the printing fluid, and the cured resin entraps and/or reacts with the dye. The dye/resin combination must be selected with great care, since the dyes must be compatible with the resin in solution and must be capable of reacting with the cellulose, with the resin or, preferably, with both during the resin curing process.

Examples of such printing fluids are disclosed in U.S. Pat. Nos. 3,860,547, 3,864,296, 3,880,792, and 3,839,291. Suitable types of dyes are disclosed in U.S. Pat. No. 3,709,903.

Aqueous printing fluids comprising an aqueous solution of a dialdehyde, preferably glyoxal or glutaraldehyde and a water-soluble cationic dyestuff having a functional group capable of reacting with the aldehyde to produce a reaction product dyestuff having improved bleed fastness on cellulosic fibers are disclosed in U.S. Pat. Nos. 4,340,386 and 4,432,900. The pH of these printing fluids is preferably acidic with a pH from about 2 to about 7 being preferred.

According to U.S. Pat. Nos. 4,340,386 and 4,432,900 these printing fluids are suitable for conventional printing techniques such as rotogravure, intaglio or flexographic printing. The alleged advantage of the use of these printing fluids in comparison with a printing fluid not containing the dialdehyde is that the dialdehyde reacts with the dyestuff as a cross-linking agent producing a dyestuff reaction product, which is significantly more water insensitive than the unreacted dyestuff, especially on cellulosic fibers. These printing fluids can be printed directly onto an already formed cellulosic web and subsequently dried to form the reaction product dyestuff, which purportedly has excellent bleed fastness on the cellulosic fibers. A mordant or other means of affixing the dye to the cellulosic fiber is not required.

A flexographic ink formulation with a solvent consisting of about 20–50% water and about 40–70% of a co-solvent selected from the group consisting of polyhydroxy alcohols having at least one hydroxyl group per four carbon atoms, ethers of such alcohols and mixtures of such alcohols and ethers, a basic dye and a water-soluble polymeric acid is disclosed in EP Patent Application No. 179 319.

The polymeric acid is alleged to provide several functions:

It establishes the viscosity at a level which is high enough for flexographic or letter press printing. It secures a pH value of the ink which is sufficiently low, typically less than 7.0, to maintain the basic dye in solution and prevent the basic dye from going into the leuco form. Further it is mentioned that the polymeric acid forms a salt with the dye to render it insoluble in water but soluble in the solvent.

An aqueous flexographic ink formulation comprising (1) an aqueous medium having a dye, a pigment or a combination of a dye and a pigment dispersed therein and (2) a fixing amount of a water-soluble curable ammonium polyamidoamine and a method for printing or dyeing a substrate by applying this ink formulation to the substrate and subjecting the applied formulation to conditions sufficient to cure the ammonium polyamidoamine are disclosed in U.S. Pat. No. 4,402,748.

Allegedly, substrates printed with such inks do not exhibit the loss of print, bleeding, etc., observed for conventional ink formulations particularly when the printed substrate is washed in detergent, accordingly these ink formulations are claimed to be particularly useful in the printing of paper towels and other paper products as well as in the printing of woven and nonwoven fabrics.

Suitable dyes are water-soluble anionic dyestuffs which may react with the cationic radicals of the ammonium polyamidoamine so as to form heteropolar bonds. In addition to the colouring material and the fixing agent, these ink formulations may contain an organic solvent miscible with water, such as a glycol or a glycol ether, preferably ethylene glycol.

An aqueous flexographic ink formulation comprising a colouring material selected from an anionic dyestuff, a pigment or mixtures thereof and a cationic fixing agent based on a water soluble, high molecular weight, crosslinked polyether amine, and a method for printing tissue paper, wherein this ink formulation is used are disclosed in GB Patent Application No. 2,030,998.

Allegedly, these inks are particularly suitable for use in the flexographic process, in particular in printing cellulosic non-woven fabrics. Fixation of the printings occurs at room temperature after a period of about 72 hours, but the fixation process may be accelerated in known manner, e.g. by heat. Printings with improved fastnesses, e.g. to water, alcohol, etc., are said to be obtained on the non-woven fabrics, in particular when ink compositions containing a pigment are used. The fixation of the anionic dyestuff is allegedly due to a reaction between the dyestuff and the cationic radicals of the polyether amine on the non-woven fabrics so as to form heteropolar bonds.

A water-borne flexographic ink which is said to provide a water-resistant print is disclosed in GB Patent Application No. 2,087,418A. The colourant in this ink is the ammonium salt of Nigrosine Sulfonic Acid, which is used in a water-based acrylic flexographic ink. A typical formulation is: 2 g ammonium salt of Nigrosine Sulfonic Acid, 1 g ammonium hydroxide (conc.), 5 g distilled water and 25 g Joncryl 78 (an aqueous acrylic ester copolymer dispersion).

It is the object of the present invention to provide an improved flexographic printing ink comprising a solvent, a colourant, a binder and additives and an improved flexographic printing method, whereby compared with the prior art working environment problems are substantially reduced or eliminated;

the solvent, the colourant, the binder and the additives may be selected among environmentally acceptable substances;

the printing apparatus may be cleaned by using environmentally acceptable cleaning liquids;

an essentially aqueous solvent may be used without limiting the choice of colourants;

the constraints on the selection of the combination of binder and colourant are substantially reduced; and high quality prints, in particular exhibiting satisfactory water insensitivity and excellent rub-off properties may be obtained by using water-soluble dyes as colourants.

SUMMARY OF THE INVENTION

In accordance with the invention these objectives are achieved by a flexographic printing ink comprising a solvent, a colourant, a binder and additives, which is characterized in that the solvent is essentially water; the colourant is a dye selected from the group consisting of basic dyes, acid dyes and disperse dyes, in the following referred to as "water-soluble dye", or a mixture of such dyes dissolved in the solvent;

the binder is selected from aqueous (meth)acrylic resins dispersed in the solvent at a pH above 7, preferably at pH about 8–9; and the additives include a wax selected from the group consisting of polyolefin waxes, paraffin waxes and mixed polyolefin and paraffin waxes dispersed in the solvent.

This flexographic printing ink is particularly suited for flexographic printing on paper substrates providing a high quality print, in particular a water insensitive print.

In contrast to the aqueous flexographic printing inks disclosed in the prior art the fixation of the water-soluble dye is not obtained by converting the water-soluble dye into a water-insoluble reaction product, e.g. by reaction with a carefully selected binder. It is believed that the fixation of the water-soluble dye in the flexographic printing ink according to the present invention is essentially obtained by inclusion in the binder and by fixation to the substrate. An excellent fixation to the substrate is secured partly by coverage and protection of the dye provided by the binder, partly by the hydrophobic character of the print achieved through the presence of the wax component.

According to a preferred embodiment flexographic printing ink is characterized in that the water is present in an amount of at least 50% by weight, preferably at least 60% by weight, most preferred at least 75% by weight;

the water-soluble dye/dyes is/are present in an amount of about 0.5–10% by weight, preferably about 1–6% by weight, more preferred about 1–5% by weight, most preferred about 2–4% by weight, calculated as solid material;

the binder is present in an amount of about 4–20% by weight, preferably 7–17% by weight, most preferred 9–16% by weight, calculated as solid material; and the wax is present in an amount of 0.5–10% by weight, preferably 2–8% by weight, most preferred 3–7% by weight, calculated as solid material;

whereby the total amount of solids is less than 30% by weight, preferably less than 25% by weight.

The flexographic ink may further include at least one additive selected from the group consisting of defoaming agents, softening or coalescing agents, thickening or rheology modifying agents in amounts of less than 0.2% by weight, 2% by weight and 1% by weight, calculated as active material, respectively.

The defoaming agents used in the flexographic ink according to the present invention may comprise defoaming agents of the silicone type, i.e. silicone fluids and silicone emulsions, as well as of the non-silicone type, i.e. dispersions of hydrophobic organic compounds in an organic liquid, the former being the most preferred type.

The softening or coalescing agents used in the flexographic ink according to the present invention may comprise glycols and in particular glycol derivatives, such as glycol ethers and esters, and aromatic esters.

The thickening or rheology modifying agents used in the flexographic ink according to the present invention may comprise inorganic substances, such as china clay and colloid silica, as well as organic substances, such as aqueous dispersion of high polymeric acrylic polymers and cellulose derivatives.

Further additives may include surfactants and dispersing agents.

The solvent may further comprise a low boiling alcohol as co-solvent, preferably not denaturated ethyl alcohol, in an amount less than 15% by weight, preferably less than 10% by weight, most preferred less than 6% by weight.

The water-soluble dye may be selected from the group consisting of basic dyes, acid dyes, preferably as salts thereof, and/or disperse dyes.

Suitable basic dyes for use in the flexographic ink according to the invention include: Basic Yellow 2, 13, 28, 37 and 65, Basic Orange 1, 2 and 59, Basic Red 1, 2, 14 and 28, Basic Violet 1, 2, 3 and 10, Basic Blue 1, 3, 5, 7, 8, 9, 11, 26, 55 and 81, Basic Green 1 and 4 and Basic Brown 1.

Suitable acid dyes for use in the flexographic ink according to the invention include: Acid Yellow 3, 5, 17, 23, 36, 54, 73, 121, 157, 194, 204 and 236, Acid Orange 3, 7, 10, 142 and 144, Acid Red 18, 52, 87, 88, 143, 221, 289, 357 and 359, Acid Green 1, 16, 26 and 104, Acid Blue 1, 7, 9, 15, 20, 22, 93, 129, 193, 254 and 285, Acid Violet 9, 17, 90, 102 and 121, Acid Brown 101, 103, 165, 266, 268, 355, 357, 365 and 384, and Acid Black 47, 52 and 194.

Suitable disperse dyes for use in the flexographic ink according to the invention include: Disperse Yellow 3, Disperse Red 4 and 60 and Disperse Blue 3.

These dyes are all classified in the Color Index, Color Index Third Edition, The American Color Association of Textile Chemists and Colorists, P.O. Box 12215, Research Triangle Park, N.C. 27709, and are well-known to all those of ordinary skill in the art.

Since the choice of dyestuff may be made virtually freely, i.e. without constraints due to the choice of binder, flexographic printing inks exhibiting all possible shades of colour may be easily achieved, even with the constraint that the dyestuff components used in the printing ink should be selected exclusively from a group of environmentally acceptable dyestuffs.

According to a preferred embodiment the water-soluble dye is selected from the following group of dyes which are particularly acceptable to the environment: E 100, E 101, E 102, E 104, E 110, E 120, E 122, E 123, E 124, E 127, E 131, E 132, E 140, E 141, E 142, E 150, E 151, E 153, E 160a, E 160b, E 16lb, E 161g, E 162, E 163, where these numbers refer to the EC list of dyestuffs in the EEC Directive on permitted food colorants of Oct. 23, 1962 including amendments of Jan. 20, 1981.

The (meth)acrylic resins are preferably selected from the group consisting of (meth)acrylic polymers, (meth)acrylic copolymers and modifyed (meth)acrylic copolymers.

The use of dyes as colourant in the flexographic ink according to the invention ensure a high degree of transparency of the print. In case an ink showing a desired degree of opacity is wanted, the colourant may further comprise a pigment, preferably in a low concentration, in addition to the water-soluble dye.

Suitable pigments include pigments selected from the group consisting of the following pigments which are particularly acceptable to the environment:

Pigment Yellow C.I. No. 77492, Pigment Red C.I. No. 77491, Pigment Black C.I. No. 77499, Azo Ruby lake C.I. No. 14720:1, Tartrazine lake C.I. No. 19140:1, Sunset Yellow lake C.I. No. 15985:1, Cochineal Red lake C.I. No. 16255:1, Amaranth lake C.I. No. 16185:1, Indigotin lake C.I. No. 73015:1, Erythrosin lake C.I. No. 45430:1 and Titanium Dioxide C.I. No. 77891.

When the ink formulation comprises a pigment, it is convenient to add a dispersion agent selected from a cationic, anionic and preferably a nonionic dispersing agent. Such dispersion agents are often present in the commercially available pigment.

The wax component is preferably selected from the group consisting of polyethylene wax, polypropylene wax, polytetrafluoroethylene wax, paraffin wax consisting of paraffins between $C_{18}H_{38}$ and $C_{32}H_{66}$ and mixed polyethylene-paraffin wax.

The printing inks according to the invention exhibit preferably a viscosity within the range about 17–25 s at 22° C., measured by using a Zahn cup no. 2.

The flexographic printing inks according to the invention may be prepared in the following way:

Aqueous stock solutions of the dyestuffs are prepared by simple solution of the dyestuff in deionized or distilled water. By the preparation of these stock solutions the risk of subsequent precipitation should be eliminated by setting the dyestuff concentration at a sufficiently low level.

Aqueous stock emulsions of binders are prepared by diluting commercially available binder suspensions with deionized or distilled water, if necessary, and, if necessary, adjusting the pH value to a desired basic value by addition of volatile amines, such as mono-, di- or triethanol amine, morpholine, N,N-diethyl ethanol amine or amonia. The commercially available binder suspensions may be classified into: ready to use type and unneutralized type. The commercially available binder suspensions of the first type may, if desired, be diluted by simple addition of deionized or distilled water, whereas it is necessary to add volatile amines and optionally deionized or distilled water when binder suspensions of the second type are utilized.

Softening and/or defoaming agents, as well as optional additional additives, are added to the aqueous binder stock emulsion with good stirring. Thereafter the aqueous solution of the water-soluble dye is added to the stirred emulsion, and then a commercially available wax emulsion is added with good stirring and, if desired, a co-solvent, e.g. ethanol, may be added. After addition of the wax emulsion a minor amount of thickening or rheology modifying agents may be added, if necessary.

The flexographic printing ink formulation may be prepared in a concentrated form which is further diluted with water before use in the printing process. The flexographic printing ink according to the invention can be distributed as a concentrate comprising a solvent being essentially water, a water-soluble dye or a mixture of such dyes dissolved in the solvent, a binder selected from aqueous (meth)acrylic resins dispersed in the solvent, and a wax selected from the group consisting of polyolefin waxes, paraffin waxes and mixed polyolefin and paraffin waxes dispersed in the solvent, whereby the amount of solvent is reduced by about 1–20%, preferably 5–20%, compared with the amount of solvent in a flexographic printing ink ready for use.

According to yet another aspect of the invention a method for printing a substrate by the flexographic printing process is provided which method comprises applying the flexographic ink described above to the substrate and subjecting the applied ink to conditions sufficient to fix the print, if desired, by application of heat.

The flexographic printing inks are particularly suited for printing cellulosic non-woven fabrics, in particular paper and cardboard by the flexographic printing method. However, the flexographic printing inks may also be used for printing on non absorbant substrates, e.g. plastic films.

According to another aspect of the present invention there are provided substrates having a permanent print thereon which is derived from the flexographic printing inks according to the present invention.

The following examples will serve to further illustrate the invention:

DETAILED DESCRIPTION OF ILLUSTRATIVE EMBODIMENTS

A number of different printing inks according to the invention was prepared. These inks were tested by flexographic printing on paper of the type DSP 207, Forenede Papirfabrikker, and the printing quality was tested by subjecting the printed substrates to a number of tests. These tests were carried out using the following test procedures:

A) Rub-off resistance

The printed material is tested in an UGRA Scheuerprüfgerät, System Huber, using the standard procedure.

B) Water insensitivity

The printed material is positioned on a glass plate and covered with a Whatman No. 1 filter paper which has been moistened with deionized or distilled water. A second glass plate is positioned on the top of the filter paper and a weight of 1.0 kg is positioned on the top of the second glass plate. After 15 s the test is stopped and the printed paper is evaluated for water insensitivity by comparison with a corresponding print, which has not been subjected to contact with moistened filter paper. The comparison results are identified on the following 0–5 water insensitivity index scale:

0—No noticeable transfer

1—Very slight transfer (barely noticeable)

2—Slight transfer

3—Moderate transfer

4—Heavy transfer

5—Very heavy transfer

Printing inks

The following starting materials were used in the preparation of a number flexographic printing inks:

| | Water-soluble dyes | | | |
|---|---|---|---|---|
| Name | EC No. | % Solids | C.I. No. | Supplied by |
| Tartrazine xx 90 | E 102 | 90 | 19140 | Hoechst |
| FD&C Yellow no. 6 (Orange RGL 85) | E 110 | 85 | 15985 | BASF (Hoechst) |
| Brilliant-Pronceau 4 RC 70 | E 124 | 70 | 16255 | Hoechst |
| Erythrosine | E 127 | 85 | 45430 | BASF |
| Brilliant Blue FCF | E 133 | 90 | 42090 | BASF |
| Brilliant Black BN | E 151 | 80 | 28440 | Pointing |

-continued

Water-soluble dyes

| Name | EC No. | % Solids | C.I. No. | Supplied by |
|---|---|---|---|---|
| β-carotene | E 160a | 2 | 40800 | Chr. Hansen's Lab. Ltd. |

Binders

| | |
|---|---|
| Joncryl 8001 (S. C. Johnson Polymer) | A colloidal, partially neutralized acrylic solution, U, solid content 36% by weight. |
| Joncryl 8051 (S. C. Johnson Polymer) | Acrylic (co-)polymer emulsion, RTU, solid content 45% by weight. |
| Joncryl 679 (S. C. Johnson Polymer) | Hard acrylic resin flake. Must be cut before use. Is adjusted to 35% solid content by weight. |
| Glascol LE 19 (Allied Colloids) | A low viscosity carboxylated acrylic copolymer supplied as a 60% emulsion, U. |
| Acrysol I-1955 (Rohm & Haas) | An aqueous alkali-soluble, acrylic emulsion, U, solid content 17% by weight. |
| Emulsion E-2426 (Rohm & Haas) | An aqueous alkali-soluble, styrene acrylic copolymer emulsion, U, solid content 14% by weight. |
| Exp. Emulsion E-2810 PMN (Rohm & Haas) | A styrene acrylic copolymer emulsion, RTU, solid content 47–48% by weight. |

RTU: Ready to use; U: unneutralized.

Waxes

| | |
|---|---|
| Jonwax 35 (Spechem) | Aqueous polyethylene wax emulsion containing 25–30% by weight polyethylene wax. |
| Jonwax 120 (Spechem) | Aqueous wax emulsion comprising polyethylene and paraffin wax, containing 20–35% by weight wax. |
| Slip Ayd SL-140 (Daniels Products Company) | Aqueous emulsion of a polymeric wax, containing 24% by weight wax. |
| Lanco Glidd TFW (Langer & Co.) | Aqueous emulsion of an acrylic polymer of polyethylene and polytetrafluoroethylene, containing 30% by weight wax. |

Defoaming agent

| | |
|---|---|
| Foamex 1488 (Tego Chemie) | Polysiloxan-polyether-copolymer |

Softening agent

| | |
|---|---|
| Dibutyl phthalate (MERCK-Schuchardt) | "zur Synthese" |

Thickening or rheology modifying agents

| | |
|---|---|
| Aerosil 200 (Degussa) | Dispersion of ultrafine silica. |

Ink preparation

Aqueous solutions of the water-soluble dyes were prepared by simple dissolution of the dyes in deionized water. The following stock solutions were prepared:

TABLE 1

| Water-soluble dye | % Solids (by weight) |
|---|---|
| E 102 | 14.0 |
| E 102 | 10.0 |
| E 102 | 4.0 |
| E 110 | 10.0 |
| E 124 | 12.0 |
| E 127 | 6.0 |
| E 133 | 12.0 |
| E 133 | 8.0 |
| E 151 | 8.0 |
| E 160a (β-carotene) | 2.0 |

Aqueous stock emulsions of binders were prepared by diluting the binder suspensions with deionized water, if necessary, and adjusting the pH value to a desired basic value, if necessary.

A number of water-borne flexographic printing inks with the following recipes were prepared from the abovementioned stock solutions in the following way:

Softening and/or defoaming agents are added to the aqueous binder stock emulsion with good stirring. Thereafter the aqueous solution of the water-soluble dye was added to the stirred emulsion, and then the wax emulsion was added under good stirring. After addition of the wax emulsion a minor amount, i.e. 0.5% by weight, of thickening or rheology modifying agents may be added. If desired, cosolvent, e.g. ethanol, and additional additives may be added.

A number of flexographic printing inks according to the present invention were prepared according to the abovementioned procedure.

Recipe for printing ink no. A

| Component | by weight |
|---|---|
| Glascol LE19 susp. (17% b) | 39.8 |
| Tartrazine E 102 solution (14% d) | 52.9 |
| Jonwax 35 (27.5% w) | 2.4 |
| Ethanol (99%) | 4.9 |

Viscosity of freshly prepared batch: 22 s at 22° C.; two days later: 23 s at 22° C.

b: binder; d: dyestuff; w: wax; viscosity measured using a Zahn cup No. 2,

Recipe for printing ink no. B

| Component | % by weight |
|---|---|
| Emulsion E-2426 susp. (14% b) | 32.6 |
| Tartrazine E 102 solution (14% d) | 59.4 |
| Jonwax 35 (27.5% w) | 3.0 |
| Ethanol (99%) | 5.0 |

Viscosity of freshly prepared batch: 21 s at 22° C.

Recipe for printing ink no. C

| Component | % by weight |
|---|---|
| Acrysol I-1955 susp. (17% b) | 9.5 |
| Emulsion E-2426 susp. (14% b) | 30.2 |
| Tartrazine E 102 solution (14% d) | 52.8 |
| Jonwax 35 (27.5% w) | 2.8 |
| Ethanol (99%) | 4.6 |

Viscosity of freshly prepared batch: 22 s at 23° C.; three days later: 23 s at 22.5° C.

Further, the following flexographic printing inks exhibiting particularly good water insensitivity were prepared according to the invention:

Recipe for printing ink no. 1

| Components | % by weight |
|---|---|
| Joncryl 8001 (36% b) | 41.00 |
| DBP | 1.50 |
| Tego Foamex 1488 | 0.15 |
| Slip Ayd SL-140 (24% w) | 4.90 |
| Tartrazine E 102 solution (4% d) | 45.95 |
| Aerosil 200 | 1.50 |
| Ethanol | 5.00 |

Viscosity: 18 s at 25.0° C. (FF1)

Recipe for printing ink no. 2

| Components | % by weight |
|---|---|
| Joncryl 8001 (36% b) | 41.30 |
| DBP | 1.50 |
| Tego Foamex 1488 | 0.15 |
| Tartrazine E 102 solution (4% d) | 45.35 |
| Lanco Glidd TFW (30% w) | 5.00 |
| Aerosil 200 | 1.80 |
| Ethanol | 5.00 |

Viscosity: 18 s at 25.0° C. (FF5)

Recipe for printing ink no. 3

| Components | % by weight |
|---|---|
| Exp. Em. 2810 PMN (47.5% b) | 31.35 |
| DBP | 1.50 |
| Tego Foamex 1488 | 0.15 |
| Slip Ayd SL-140 (24% w) | 5.00 |
| Lanco Glidd TFW (30% w) | 5.00 |
| Tartrazine E 102 solution (4% d) | 49.40 |
| Aerosil 200 | 2.70 |
| Ethanol | 5.00 |

Viscosity: 18 s at 25.0° C. (FF7)

Recipe for printing ink no. 4

| Components | % by weight |
|---|---|
| Joncryl 8001 (36% b) | 40.90 |
| DBP | 1.50 |
| Tego Foamex 1488 | 0.15 |
| Slip Ayd SL-140 (24% w) | 4.90 |
| Lanco Glidd TFW (30% w) | 4.90 |
| Tartrazine E 102 solution (4% d) | 40.90 |
| Aerosil 200 | 1.80 |
| Ethanol | 4.90 |

Viscosity: 18 s at 25.0° C. (FF6)

Recipe for printing ink no. 5

| Components | % by weight |
|---|---|
| Exp. Em. 2810 PMN (47.5 b) | 31.60 |
| DBP | 1.50 |
| Tego Foamex 1488 | 0.15 |
| Jonwax 35 (27.5% w) | 25.00 |
| Tartrazine E 102 solution (4% d) | 35.30 |
| Aerosil 200 | 1.50 |
| Ethanol | 5.00 |

Viscosity: 19 s at 23.6° C. (FF16)

Recipe for printing ink no. 6

| Components | % by weight |
|---|---|
| Exp. Em. 2810 PMN (47.5% b) | 29.15 |
| DBP | 1.40 |
| Tego Foamex 1488 | 0.14 |
| Jonwax 35 (27.5% w) | 23.10 |
| Tartrazine E 102 solution (4% d) | 32.40 |
| TR 92, TiO | 4.90 |
| Aerosil 200 | 4.20 |
| Ethanol | 4.70 |

Viscosity: 21 s at 23.6° C. (FF20–1).

Recipe for printing ink no. 7

| Components | % by weight |
|---|---|
| Exp. Em. 2810 PMN (47.5% b) | 28.70 |
| DBP | 1.40 |
| Tego Foamex 1488 | 0.14 |
| Jonwax 35 (27.5% w) | 18.16 |
| Lanco Glidd TFW (30% w) | 4.50 |
| Tartrazine E 102 solution (4% d) | 32.70 |
| β-carotene (2% d) | 6.00 |
| Aerosil 200 | 3.90 |
| Ethanol | 4.50 |

Viscosity: 22 s at 24.0° C. (FF31).

Recipe for printing ink no. 8

| Components | % by weight |
|---|---|
| Joncryl 678 | 16.55 |
| Joncryl 8051 | 12.42 |
| DBP | 1.55 |
| Foamex 1488 | 0.16 |
| E 133, 8% | 7.24 |
| E 102, 10% | 24.83 |
| Jonwax 120 | 14.49 |
| Ethanol | 6.21 |
| Water | 16.55 |

Viscosity: 22 s at 22° C.

Recipe for printing ink no. 9

| Components | % by weight |
|---|---|
| Joncryl 678 | 33.11 |
| DBP | 1.55 |
| Foamex 1488 | 0.16 |
| E 133, 8% | 7.24 |
| E 102, 10% | 24.83 |
| Jonwax 120 | 14.49 |
| Ethanol | 6.21 |
| Water | 12.42 |

Viscosity: 19 s at 22° C.

Recipe for printing ink no. 10

| Components | % by weight |
|---|---|
| Joncryl 678 | 32.11 |
| DBP | 1.51 |
| Foamex 1488 | 0.15 |
| E 110, 10% | 24.08 |
| E 127, 6% | 16.06 |
| Jonwax 120 | 8.03 |
| Ethanol | 6.02 |
| Water | 12.04 |

Viscosity: 19 s at 22° C.

Recipe for printing ink no. 11

| Components | % by weight |
|---|---|
| Joncryl 8051 | 14.05 |
| Joncryl 678 | 16.06 |
| DBP | 1.51 |
| Foamex 1488 | 0.15 |
| E 110, 10% | 24.08 |
| E 127, 6% | 16.06 |
| Jonwax 120 | 8.03 |
| Ethanol | 6.02 |
| Water | 14.05 |

Viscosity: 20 s at 22° C.

Recipe for printing ink no. 12

| Components | % by weight |
|---|---|
| Joncryl 678 | 37.06 |
| DBP | 1.48 |
| Foamex 1488 | 0.15 |
| E 124, 12% | 3.94 |
| E 133, 12% | 30.75 |
| E 151, 8% | 5.91 |
| Jonwax 120 | 11.83 |
| Ethanol | 4.93 |
| Water | 3.94 |

Viscosity: 22 s at 22° C.

Printing tests

The above-mentioned printing inks were subjected to a number of tests:

Printing inks A-C and 1–12 were applied to a sheet of paper (type DSP 207, Forenede Papirfabrikker) with a handproofer.

The rub-off resistance of the prints was determined on a UGRA Scheuerprüfgerät, System Huber, as described above.

The results are shown in tables 2 and 3.

TABLE 2

| Printing ink | Rub-off Dry paper 1) | Rub-off Conditioned paper 2) |
|---|---|---|
| A | 1 | 1 |
| B | 1 | 1 |
| C | 1 | 1 |

TABLE 3

| Printing ink | Rub-off Dry paper 1) |
|---|---|
| 1 | 0 |
| 2 | 0 |
| 3 | 0 |
| 4 | 0 |
| 5 | 0 |
| 6 | 0 |
| 7 | 0 |
| 8 | 0 |
| 9 | 1 |
| 10 | 1 |
| 11 | |
| 12 | 1 |

1) conditioned at a relative humidity of about 50% for 24 h at 20° C.
2) conditioned at a relative humidity of 97% for 24 h at 20° C.

The results are indicated by using a scale ranging from (good) to 5 (poor).

Corresponding tests using a commercial pigment based flexographic printing ink resulted in printings showing a rub-off value about 4.

The prints were further subjected to the above-mentioned test for water insensitivity. The results are shown in table 4.

TABLE 4

| Printing ink | Water insensitivity index |
|---|---|
| 1 | 3 |
| 2 | 2 |
| 3 | 3 |
| 4 | 2 |
| 5 | 1 |
| 6 | 2 |

TABLE 4-continued

| Printing ink | Water insensitivity index |
|---|---|
| 7 | 2 |
| 8 | 3 |
| 9 | 3 |
| 10 | 3 |
| 11 | 2 |
| 12 | 3 |
| A | 4 |
| B | 4 |
| C | 4 |

All recipes exhibit good printing properties in laboratory testing with handproofer.

Ink A-C have further been tested by printing trials on a full scale flexographic printing press, where paper was printed. The tests were performed during one day, where no serious printing problems occurred. Furthermore, it was noticed that the ink was easy to wash of the rollers with water.

In table 2 it is seen that the humidity of the paper had no significant influence on rub-off. The resistance towards rub-off is improved for ink 1-12, which can be seen in table 3.

In table 4 it is seen that ink 1-12 has a lower water insensitivity index, and as a consequence a higher resistance towards water, than ink A-C.

These improved properties with regard to rub-off and water insensitivity are achieved by reducing the content of colourant, choosing another wax or binder, and increasing the concentration of these two components.

We claim:

1. A flexographic printing ink comprising a solvent, a colourant, a binder and a wax, wherein the solvent is essentially water;

the colourant is a water-soluble dye or a mixture of such dyes dissolved in the solvent;

the binder is selected from (meth)acrylic resins dispersed in the solvent at a pH above 7; and the wax is selected from the group consisting of polyolefin waxes, paraffin waxes, and mixed polyolefin and paraffin waxes dispersed in the solvent, and wherein the flexographic printing ink includes greater than 50% by weight water.

2. A flexographic ink according to claim 1 wherein the water is present in an amount of at least 50% by weight;

the water-soluble dye or mixture of dyes is present in an amount of about 0.5–10% by weight, calculated as solid material;

the binder is present in an amount of about 4–20% by weight, calculated as solid material; and the wax is present in an amount of about 0.5–10% by weight, calculated as solid material.

3. A flexographic ink according to claim 1, wherein the water is present in an amount of at least 60% by weight;

the water-soluble dye or mixture of dyes is present in an mount of about 1–6% by weight, calculated as solid material;

the binder is present in an amount of about 7–17% by weight, calculated as solid material; and the wax is present in an amount of about 2–8% by weight, calculated as solid material.

4. A flexographic ink according to claim 1, wherein the water is present in an amount of at least 75% by weight;

the water-soluble dye or mixture of dyes is present in an amount of about 1–5% by weight, calculated as solid material;

the binder is present in an amount of about 9–16% by weight, calculated as solid material; and the wax is present in an amount of about 3–7% by weight, calculated as solid material.

5. A flexographic ink according to claim 1, wherein the total amount of solids is less than 30% by weight.

6. A flexographic ink according to claim 1, wherein the total amount of solids is less than 25% by weight.

7. A flexographic ink according to claim 1, wherein the solvent includes a low boiling alcohol as co-solvent in an amount less than 15% by weight.

8. A flexographic ink according to claim 1, wherein the solvent includes a low boiling alcohol as co-solvent in an amount less than 10% by weight.

9. A flexographic ink according to claim 1, wherein the solvent includes a low boiling alcohol as co-solvent in an amount less than 6% by weight.

10. A flexographic ink according to claim 1, wherein the water soluble dye is selected from the group consisting of E 100, E 101, E 102, E 104, E 110, E 120, E 122, E 123, E 124, E 127, E 131, E 132, E 140, E 141, E 142, E 150, E 151, E 153, E 160a, E 160b, E 161b, E 161g, E 162, E 163, and combinations thereof, where these numbers refer to the EC list of dye stuffs.

11. A method for printing a substrate by the flexographic printing process, which method comprises applying the flexographic ink according to claim 1 to the substrate and fixing the applied ink.

12. A flexographic ink according to claim 1, wherein the water-soluble dye is a basic dye, preferably as a salt thereof.

13. A flexographic ink according to claim 1, wherein the water-soluble dye is an acid dye, preferably as a salt thereof.

14. A flexographic ink according to claim 1, wherein the water-soluble dye is a disperse dye.

15. A flexographic ink according to claim 1, wherein the (meth)acrylic resins are selected from the group consisting of (meth)acrylic polymers, (meth)acrylic copolymers and modifyed (meth)acrylic copolymers.

16. A flexographic ink according to claim 1, wherein the wax is selected from the group consisting of polyethylene wax, polypropylene wax, polytetrafluoroethylene wax, paraffin wax consisting of paraffins between $C_{18}H_{38}$ and $C_{32}H_{66}$ and mixed polyethylene-paraffin wax.

17. A flexographic ink according to claim 1, wherein the colourant further comprises a pigment, preferably selected from the group consisting of:

Pigment Yellow C.I. No. 77492, Pigment Red C.I. No. 77491, Pigment Black C.I. No. 77499, Azo Ruby lake C.I. No. 14720:1, Tartrazine lake C.I. No. 19140:1, Sunset Yellow lake C.I. No. 15985:1, Cochineal Red lake C.I. No. 16255:1, Amaranth lake C.I. No. 16185:1, Indigotin lake C.I. NO. 73015:1, Erythrosin lake C.I. No. 45430:1 and Titanium Dioxide C.I. No. 77891.

18. A flexographic ink according to claim 17, wherein it further includes a dispersion agent.

19. A flexographic ink according to claim 1, wherein it has a viscosity within the range about 17–25 s at 22° C., measured by using a Zahn cup no. 2.

20. A substrate having a permanent print thereon which is derived from a flexographic printing ink as claimed in claim 1.

* * * * *

UNITED STATES PATENT AND TRADEMARK OFFICE
CERTIFICATE OF CORRECTION

PATENT NO. : 5,534,049

DATED : July 9, 1996

INVENTOR(S) : Wallstrom et al.

It is certified that error appears in the above-identified patent and that said Letters Patent is hereby corrected as shown below:

```
TITLE PAGE, ITEM
[73], Assignee:  "A?S" should read --A/S--

Col. 9, line 62 "TR92,TiO" should read --TR92,TiO₂--

Col. 11, line 46 insert --1-- after the numeral "11"

Col. 11, line 51 insert --0-- after the word "from"
```

Signed and Sealed this

Twenty-sixth Day of November 1996

Attest:

BRUCE LEHMAN

*Attesting Officer*      *Commissioner of Patents and Trademarks*